Feb. 6, 1951

F. J. SOMERS 2,540,179

SIGNAL INDICATING SYSTEM

Filed Dec. 30, 1947

2 Sheets-Sheet 1

INVENTOR.
Frank J. Somers
BY
[signature]
ATTORNEY

Feb. 6, 1951 F. J. SOMERS 2,540,179

SIGNAL INDICATING SYSTEM

Filed Dec. 30, 1947 2 Sheets-Sheet 2

INVENTOR.
Frank J. Somers
BY
[signature]
ATTORNEY

Patented Feb. 6, 1951

2,540,179

UNITED STATES PATENT OFFICE 2,540,179

SIGNAL INDICATING SYSTEM

Frank J. Somers, Rockville Centre, N. Y., assignor to Radio Corporation of America, a corporation of Delaware Application December 30, 1947, Serial No. 794,571

7 Claims. (Cl. 315—26)

This invention relates to cathode ray tube indicating devices and more particularly to circuit arrangements and devices for establishing reference indications of known adjustable magnitude in connection with signal indications.

It frequently occurs in the measurement of electrical signals that it is desired to study with a cathode ray oscilloscope the phenomena of low frequencies or phenomena in which the main level or D. C. value is of importance. Such a requirement normally demands a direct current amplifier with direct coupling on the deflector plates of the cathode ray tube, an arrangement which is not generally available commercially and which requires considerable time and experience to construct and operate.

Other circuit arrangements have been proposed for preserving the direct current level in oscilloscope amplifiers, and it is to this subject that the present invention is particularly directed.

It has been proposed by A. W. Russell, on page 173 of "Electronic Engineering" for September 1942, that a switching arrangement be provided to alternately connect at a reasonably rapid rate the signal to be measured and a predetermined bias potential, such as, for example, a zero potential.

By employing a vibrator or interrupter in this way, a steady voltage is converted into a square topped wave of the natural frequency of the vibrator, while any alternating voltage component of the signal to be measured appears superimposed on the flat tops of the waves. Such a wave form can be handled by almost any oscilloscope amplifier.

A particularly important application of such a device is its relation to a method of measuring the degree of modulation of a television signal.

The terminal equipment of a television system, which includes the camera with its associated scanning and synchronization-impulse generators, produces a succession of electrical impulses that corresponds to the optical information of the scene in the studio or of a film, together with auxiliary signals that establish and maintain the timing of the scanning process and the relative background illumination level. The two sets of signals, the camera impulses and the synchronizing impulses are combined so that they may be transmitted over one communication channel, and the combined signal is popularly known as the "video signal."

In its application to television systems, the signal indicating device must therefore not only indicate wave shape, but must produce reference indications for the complete and accurate analysis of television signals and the like.

In the U. S. patent of Thomas J. Buzalski, No. 2,538,503, issued on January 16, 1951, and in the June 1946 issue of the "RCA Review," there is shown and described a method and circuit arrangement for measuring a television signal.

The double sideband output of the television transmitter energizes a linear diode detector, the output of which contains a direct current component, in addition to the visual signal. Means are then provided to interrupt this composite signal periodically by short-circuiting the diode output load impedance for a brief interval, thus establishing a reference zero signal. The resultant modified signal, including the zero reference level, may be observed by means of the cathode ray oscilloscope, capable of handling only alternating current signals. The trace on the face of the oscilloscope will contain all the information required to measure the degree of modulation attained.

Hallmark U. S. Patent 2,293,135, dated August 18, 1942, shows still another form of circuit arrangement for providing the normal oscilloscope with circuit arrangements to give convenient representations of a complex signal train, such as television signals and the like.

Hallmark proposes that, in addition to shorting the oscilloscope input circuit, a bias potential be included in the shorting circuit or in series with the contact devices to provide for a base line which is adjustable as to position on the oscilloscope screen. Thus, an electrically movable datum line is provided for the oscilloscope screen.

According to the present invention, a conveniently adjustable known bias potential is continuously provided ahead of the contactor or shorting device to produce reference markers of known voltage amplitude relative to the applied signal on the cathode ray screen and in such a manner that the unknown signal applied to the oscilloscope is also continuously distinguishable.

According to another form of this invention, two independently variable known bias potentials are applied so that differences in any portions of the signal may be measured quickly, conveniently and accurately.

A primary object of this invention is to provide an improved signal indicating device and means for rapid and accurate measurement of the amplitude of such indications.

Another object is to provide a simple portable calibrating device for use with any of the usual commercial forms of cathode ray oscilloscopes having an A. C. amplifier between the input and the deflecting plates.

Another object of this invention is to provide for increased accuracy in the examination of complex signal trains.

Other and incidental objects of the invention will be apparent to those skilled in the art from a reading of the following specification and an inspection of the accompanying drawing in which.

Figures 2, 3, 4:
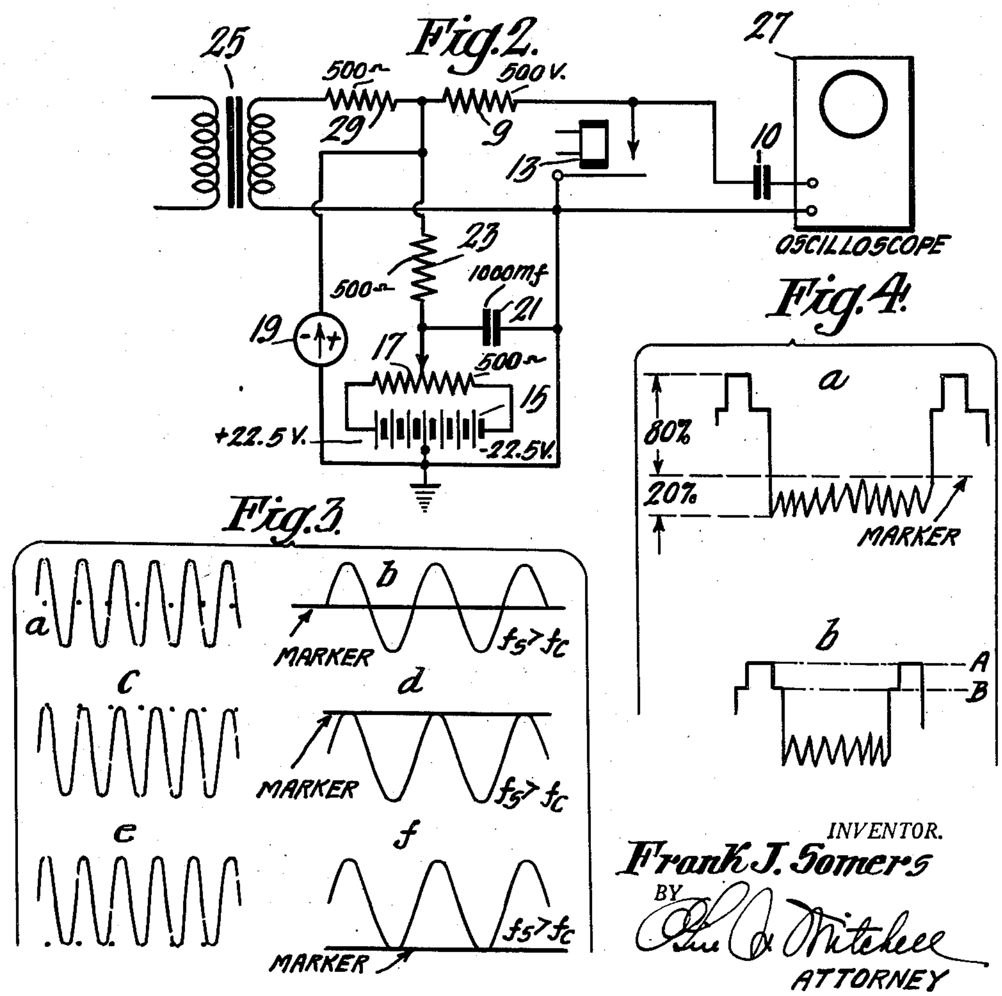
Figure 2 shows also by circuit diagram another form of this invention.
Figure 5:
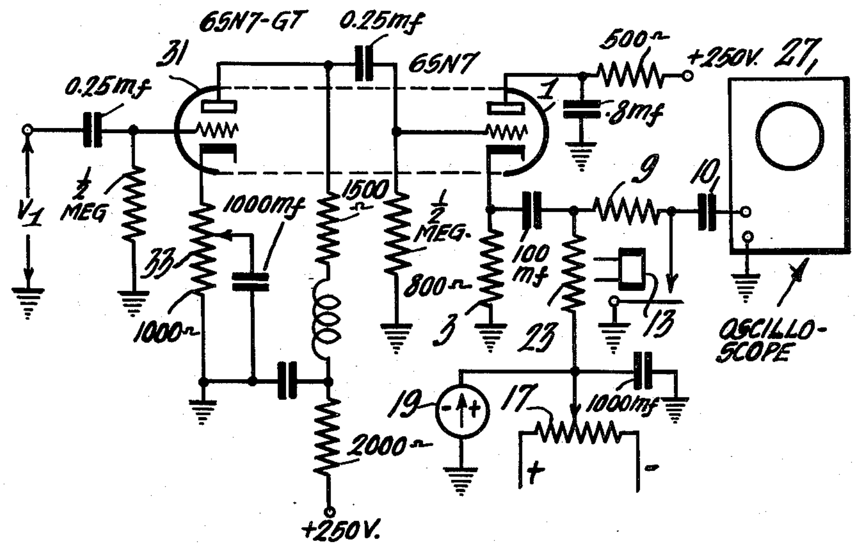
Figure 5:
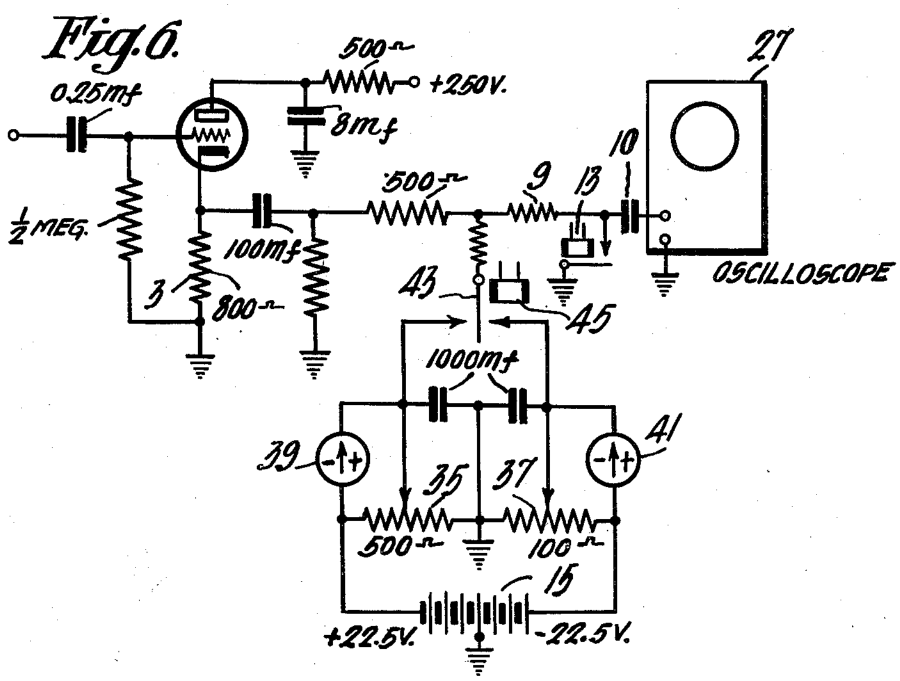

Figures 3 and 4 in each of their parts illustrate graphically the operation of this invention; and Figures 5 and 6 show by circuit diagram still other forms of this invention.

Figure 1:
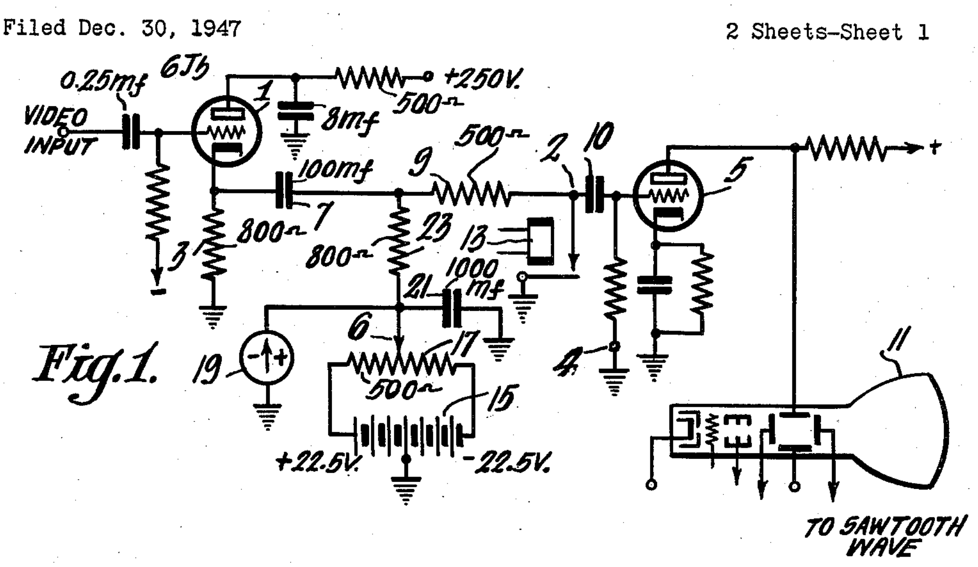
Figure 1 shows by circuit diagram one form of this invention.

Turning now in more detail to Figure 1, there is indicated a video input circuit which, although related to television signals, may be equally applicable to other forms of complex signal waves, especially those representing a wide frequency spectrum. The video signal is applied to the control electrode of tube 1, which provides a low impedance output signal through its cathode coupling. The signal is developed across cathode resistor 3.

The signal developed across resistor 3 is transmitted to input terminal 2 of the cathode ray oscilloscope including, for purposes of example, amplifying tube 5 and cathode ray tube 11. The signal energy is furnished the control electrode tube 5 through condenser 7, resistor 9 and condenser 10.

The other input terminal of the oscilloscope, including tubes 5 and 11 and designated as terminal 4, is connected to ground, as indicated.

The A. C. coupled amplifier tube 5, together with the cathode ray tube 11, may take any of the well known forms presently proposed for cathode ray oscilloscopes and is shown by circuit diagram in this form of the invention merely by way of example. In general practice, more than one A. C. coupled amplifier stages are usually employed in commercially available oscilloscopes.

One suitable type of cathode ray oscilloscope is shown and described, beginning on page 276 of the textbook entitled "Practical Radio Communication" by Nilson and Hornung, second edition, published in 1943 by the McGraw-Hill Book Co., Inc. Any high quality oscilloscope of normal design is suitable for employment in the practice of this invention. It will be understood that one or more stages of A. C. coupled amplification can be employed in the practice of this invention without altering the effectiveness or departing from the spirit thereof.

The input signal of the oscilloscope is shorted by contactor or vibrator 13. A mechanical contactor is shown in a preferred form of the invention. An electronic shorting device using gaseous discharge tubes, such as shown and described in the Hallmark Patent 2,293,135 referred to above, may be employed in place of the mechanical contactor. The mechanical contactor is, however, simple, reliable and has low contact resistance.

The contactor or buzzer 13 may be actuated in any of the well known manners. It may be actuated, for example, by supplying the coil arrangement illustrated with an interrupted direct current voltage. In one form of this invention, the mark to space ratio of the contactor 13 may be small, such as the order of 5%. In other words, contactor 13 may be closed to form a closed circuit 5% of the time. The frequency should be adjustable for convenience, and different indications may be obtained by the variation of the mark to space ratio of the contactor 13 and its frequency of operation, as will be explained in more detail in connection with the graphic illustrations of Figures 3 and 4.

A suitable bias potential source is provided by battery 15, which is made adjustable through potentiometer 17. The applied bias potential is measured by meter 19. Meter 19, in one form of the invention, is connected, as shown, to potentiometer arm 6. In another form of the invention, meter 19 is connected to the junction of resistors 9 and 23. Condenser 21 of relatively large capacity is provided for by-pass to insure accurate application of the desired bias potential.

Resistor 23 is inserted in the circuit to provide a D. C. return path for condenser 7, and its value is chosen large enough so as not to unduly attenuate the signal applied to the input of the oscilloscope when the contactor is open.

The theory of operation of the present invention may perhaps best be understood after a brief reference to the operation of the presently marketed cathode ray oscilloscopes.

In present practice, the peak amplitude of an unknown signal voltage appearing on an oscilloscope screen is normally measured by adjusting the vertical amplifier gain so that the wave is projected between convenient vertically spaced marks on the oscilloscope screen. The input circuit of the vertical deflection amplifier is then switched to a known A. C. or calibrating voltage source normally consisting of a 60 cycle A. C. voltmeter calibrated in peak-to-peak values. The calibrating voltage is then adjusted until the peaks of the wave fit between the marks on the oscilloscope screen. The peak-to-peak voltage is then read on the A. C. voltmeter.

The system referred to immediately above, while reasonably accurate, has several disadvantages:

1. The signal wave form to be measured is not displayed on the oscilloscope screen when the calibration is made.

2. The amplitudes of both the unknown wave form and the calibrating signals have to be accurately adjusted to a set of index marks. This is time-consuming and leads to errors, since the incoming signal may change during the time the oscilloscope is switched to the calibrating position.

3. Unless the calibrating voltage is a pure sine wave, errors will occur due to the employment of an "RMS" type meter to read peak-to-peak values.

The present invention eliminates these disadvantages and errors because of the fact that the unknown wave is visible at all times, the calibration of the oscilloscope is in terms of a D. C. voltmeter reading, which is accurate, and the readings may be made more rapidly.

In accordance with the form of the invention shown in Figure 1, it will be noticed that when the contactor 13 is not energized and left open, the oscilloscope functions in an entirely normal manner, the circuit components and the distributed capacitance being such that there is no discrimination against video frequencies.

Contactor 13 is normally operated with a mark to space ratio of about 5% and at a frequency well above the lower frequency cut-off of the oscilloscope amplifier—i. e., the contactor frequency will normally be 100 cycles or higher. When the contactor closes, the incoming signal is shorted and the oscilloscope input is momentarily connected to a known D. C. potential, as determined by the position of potentiometer arm 6 of resistor 17 and the zero-center D. C. voltmeter 19. Capacitor 21, having a large value and consequently a very low impedance at the contactor frequency, effectively by-passes the signal to ground around the meter 19 and the D. C. voltage source. When the contactor opens, the incoming signal is again applied to the oscilloscope input. The values of capacitor 7 and resistor 23 are chosen to have a long time constant with respect to the vibrator frequency. Thus, while condenser 7 tends to discharge via resistor 9 to ground when the contactor closes, and to charge via the calibrating potential source and resistor 23 when the contactor is open, it will normally accumulate an average steady charge for any given setting of the arm 6 of resistor 17 within a reasonably short time, say 20 to 30 cycles of the contactor operating at 100 cycles per second. In some cases, it may be desirable to use a high resistance voltmeter 19 connected to the junction of condenser 7 and resistor 9 to avoid calibration errors caused by voltage drop across resistor 23 due to charging current for condenser 7.

The appearance of the marker on the oscilloscope screen, when viewing a symmetrical sine wave, is shown in curve *a* of Figure 3, where the horizontal sweep frequency of the oscilloscope is less than the contactor frequency.

When the horizontal sweep frequency is greater than the contactor frequency and the D. C. voltmeter reading zero is shown in curve *b* of Figure 3, an indication such as shown in curve *b* of Figure 3 is obtained on the oscilloscope screen.

In order to measure the amplitude of the incoming wave, the marker is first shifted by adjusting potentiometer 17 to the positive peak, as illustrated in curves *c* or *d* of Figure 3, and the reading of the meter 19 noted. The marker is then shifted to the bottom peak by potentiometer 17, as shown in curves *e* or *f* of Figure 3, and the voltmeter reading is then taken. The difference in the two voltmeter readings is then equal to the actual peak-to-peak amplitude of the wave.

If a non-symmetrical wave, such as the television signal, is applied to the oscilloscope, the wave form with the meter reading zero is as shown in curve *a* of Figure 4. The two voltmeter readings for this condition will be unequal, and the dissymmetry of the wave $$\frac{V_1}{-(-V_1)+V_2}$$

as well as the peak-to-peak value $(V_2-(-V_1))$, may be measured. The voltage amplitude of an individual part of a complex wave may be measured by shifting the marker as indicated in curve *b* of Figure 4, from A to B.

When the marker is not needed, it can be removed from the screen of the oscilloscope by turning off the contactor.

It will be seen that the unknown wave can be seen at all times, and that a simple battery and D. C. voltmeter is an accurate standard of comparison.

Turning now to Figure 2, there is shown another circuit arrangement wherein like numerals refer to elements similar to those shown and described for Figure 1 above.

In the form of the invention shown in Figure 2, the source of input signals is provided through transformer 25, and the oscilloscope 27 is indicated in block for purposes of convenience. In the form of the invention shown in Figure 2, the primary purpose of resistances 29 and 9 is to reduce the short circuit current across the battery 15, while resistance 23 serves as a load circuit for feeding the calibration signals to the oscilloscope.

Turning now in detail to Figure 5, there is shown another form of this invention wherein an amplifier tube section 31 is employed to compensate for the loss in signal level due to the use of the cathode follower 1.

The gain control 33 will normally be adjusted to a value providing for unity voltage gain between the input of the amplifier and the oscilloscope input with the contactor open.

Figure 6 shows by circuit diagram still another form of this invention whereby both the upper and lower amplitude limits can be read simultaneously on the face of the oscilloscope 27. This provides for certain advantages in monitoring television signals. Furthermore, the ratio of the two meter readings is a measure of the asymmetry of the wave.

The voltage source 15, center tapped to ground, is shunted by two potentiometers 35 and 37. Two D. C. voltmeters 39 and 41 are provided. A switching device 43 operates to switch from one bias potential to another. The operation of switch 43 can be accomplished either mechanically or, preferably, electrically, with solenoid 45 at a desired frequency. The contactor 13, which could be utilized to give a zero reference also, may be employed, if desired, and would operate in the manner explained above.

Having thus described the invention, what is claimed is:

1. A cathode ray indicator having a signal input circuit employing an A. C. coupled amplifier, an electron gun for producing a cathode ray beam, a fluorescent screen and a cathode ray beam deflecting arrangement for causing said beam to trace a curve on said screen upon the application of a signal to said input circuit, means for producing a reference indication on said fluorescent screen comprising an intermittently operative substantially zero impedance signal circuit shorting arrangement connected at the input of said A. C. coupled amplifier, and means for continually applying a bias potential to said signal input circuit of said cathode ray indicator during operation of said cathode ray indicator.

2. A cathode ray indicator having a signal input circuit, means for developing a cathode ray beam, a fluorescent screen and a cathode ray beam deflecting arrangement for causing said beam to trace a curve on said screen upon the application of a signal to said input circuit, means for producing a reference indication on said fluorescent screen comprising an electrical relay having a pair of contactors adapted intermittently to form an electrical connection, said pair of contactors connected in parallel with said cathode ray indicator signal input circuit, and a serially connected source of bias potential and a resistance element continually connected across said signal input circuit of said cathode ray indicator during operation of said cathode ray indicator.

3. A cathode ray indicator having a signal input circuit, means for developing a cathode ray beam, a fluorescent screen and a cathode ray beam deflecting arrangement for causing said beam to trace a curve on said screen upon the application of a signal to said input circuit, means for producing a reference indication on said fluorescent screen comprising an electrical relay having a pair of contactors adapted intermittently to form an electrical connection, said pair of contactors connected in parallel with said cathode ray indicator signal input circuit, means to serially connect an adjustable source of bias potential and a resistance element continually connected across said signal input circuit of said cathode ray indicator during operation of said cathode ray indicator, and means to indicate the value of the bias so applied.

4. A cathode ray indicator having a signal input circuit, means for developing a cathode ray beam, a fluorescent screen, and a cathode ray beam deflecting arrangement for causing said beam to trace a curve on said screen upon the application of a signal to said input circuit, means for producing a reference indication on said fluorescent screen comprising an electrical relay having a pair of contactors adapted intermittently to form an electrical connection, and having a small mark to space ratio, said pair of contactors connected in parallel with said cathode ray indicator signal input circuit, and a serially connected source of bias potential and a resistance element continually connected across said signal input circuit of said cathode ray indicator during operation of said cathode ray indicator.

5. A circuit arrangement for producing a reference indication on the fluorescent screen of a cathode ray indicator comprising an intermittently operating signal circuit shorting arrangement of substantially zero impedance connected in parallel with said cathode ray indicator input signal and a serially connected source of bias potential and a resistance element continually connected across said signal input circuit of said cathode ray indicator during operation of said cathode ray indicator.

6. A cathode ray indicator having a signal input circuit, an electron gun for producing a cathode ray beam, a fluorescent screen and a cathode ray beam deflecting arrangement for causing said beam to trace a curve on said screen upon the application of a signal to said input circuit, means for producing a reference indication on said fluorescent screen comprising a source of bias potential connected in parallel with said cathode ray indicator signal input circuit during operation of said cathode ray indicator, and an electrical contactor adapted intermittently to form an electrical connection of substantially zero impedance during relatively short time intervals across said signal input circuit of said cathode ray indicator.

7. A cathode ray indicator having a signal input circuit, an electron gun for producing a cathode ray beam, a fluorescent screen and a cathode ray beam deflecting arrangement for causing said beam to trace a curve on said screen upon the application of a signal to said input circuit, means for producing a reference indication on said fluorescent screen comprising an intermittently operating signal shorting circuit of substantially zero impedance connected in parallel with said signal input circuit, a pair of independently adjustable sources of bias potential and a switching arrangement to connect said sources of bias potential, one at a time, across said signal input circuit of said cathode ray indicator.

FRANK J. SOMERS.

REFERENCES CITED

The following references are of record in the file of this patent:

UNITED STATES PATENTS

| Number | Name | Date |
|---|---|---|
| 2,089,430 | Roys et al. | Aug. 10, 1937 |
| 2,122,499 | Stocker | July 5, 1938 |
| 2,178,074 | Jakel et al. | Oct. 13, 1939 |
| 2,284,219 | Loughren | May 26, 1942 |
| 2,293,135 | Hallmark | Aug. 18, 1942 |
| 2,432,196 | Hershberger | Dec. 9, 1947 |
| 2,439,050 | Mallory | Apr. 6, 1948 |
| 2,439,321 | Starr | Apr. 6, 1948 |
| 2,448,363 | Firestone et al. | Aug. 31, 1948 |